United States Patent [19]

Itkis et al.

[11] Patent Number: 5,005,910
[45] Date of Patent: Apr. 9, 1991

[54] APPARATUS FOR RESTRICTING RELATIVE MOVEMENT OF BELT PORTIONS

[75] Inventors: Isaak A. Itkis, Southfield; Louis A. LaFrate, Sterling Heights, both of Mich.

[73] Assignee: TRW Vehicle Safety Systems Inc., Lyndhurst, Ohio

[21] Appl. No.: 376,313

[22] Filed: Jul. 6, 1989

[51] Int. Cl.⁵ .............................................. A47C 31/00
[52] U.S. Cl. ..................................... 297/483; 24/170; 24/171
[58] Field of Search ................. 297/483, 468, 482; 280/801, 808; 24/685 B, 68 A, 715 B, 170, 171, 490

[56] References Cited

U.S. PATENT DOCUMENTS

| | | | |
|---|---|---|---|
| 417,648 | 12/1889 | Knapp et al. | 24/170 |
| 438,912 | 10/1890 | Day, Jr. | 24/170 |
| 447,070 | 2/1891 | Henry | 24/171 |
| 3,773,290 | 11/1973 | Mowery | 24/490 X |
| 4,101,171 | 7/1970 | Sasaki et al. | 297/483 |
| 4,184,234 | 1/1980 | Anthony et al. | 24/171 X |
| 4,461,492 | 7/1984 | Miki | 280/808 X |
| 4,685,740 | 8/1987 | Fohl | 297/468 |
| 4,796,919 | 1/1989 | Linden | 297/483 X |

FOREIGN PATENT DOCUMENTS

| | | | |
|---|---|---|---|
| 790246 | 11/1935 | France | 24/171 |
| 7431201 | 4/1976 | France | 297/483 |
| 1005044 | 9/1965 | United Kingdom | 297/468 |

*Primary Examiner*—Jose V. Chen
*Attorney, Agent, or Firm*—Tarolli, Sundheim & Covell

[57] ABSTRACT

An apparatus for restricting relative sliding movement of first and second belt portions arranged in an overlapping side-by-side relationship is usable with a three-point safety seat belt system for securing a child's seat on a vehicle seat. The apparatus includes a V-shaped member having a pair of leg portions and a bight portion interconnecting the leg portions. The V-shaped member has an opening in the bight portion. A bar is pivotally connected to the leg portions of the V-shaped member. When it is desired to secure a child's seat on a vehicle seat, the lap belt portion is extended around the child's seat and a tongue plate slidably fastened to the lap and shoulder belt portions is secured to a belt buckle. With the bar in an open position, a loop formed from overlapped lap and shoulder belt portions of the seat belt webbing adjacent the tongue plate is inserted through the opening in the bight portion of the V-shaped member. The bar is received in the loop and is moved to a closed position between the leg portions. The bar clamps the lap and shoulder belt portions of the loop against the V-shaped member when tension is applied at least to one of the belt portions to restrict relative sliding movement of the lap and shoulder belt portions.

11 Claims, 3 Drawing Sheets

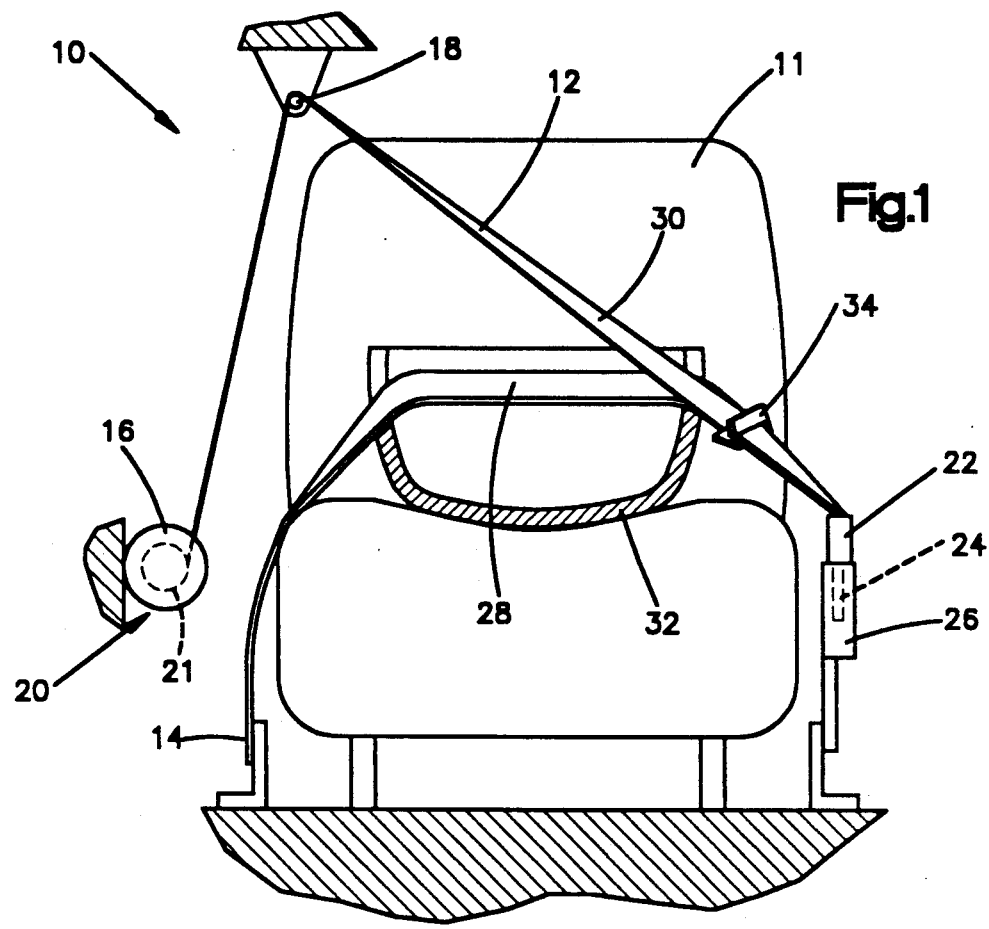
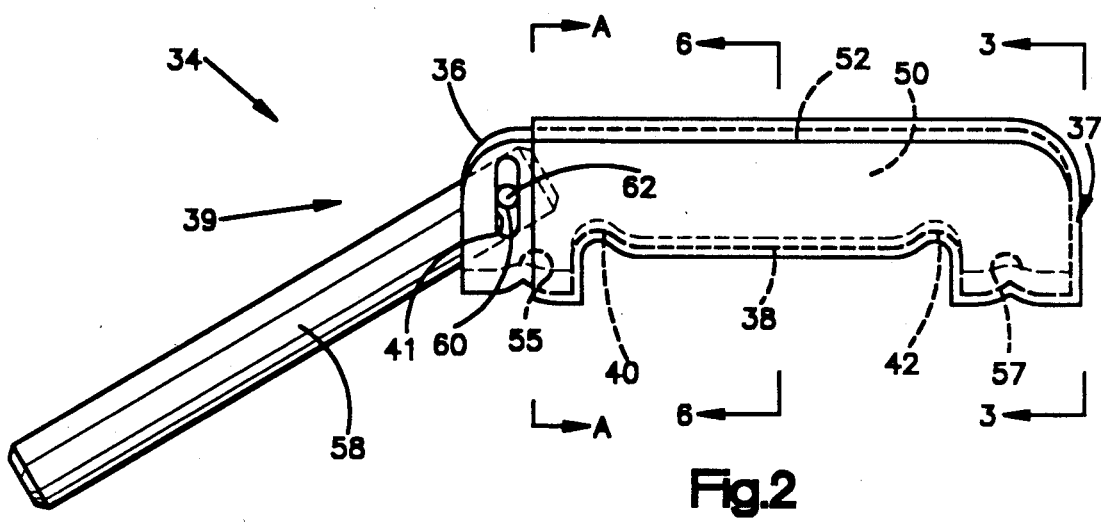

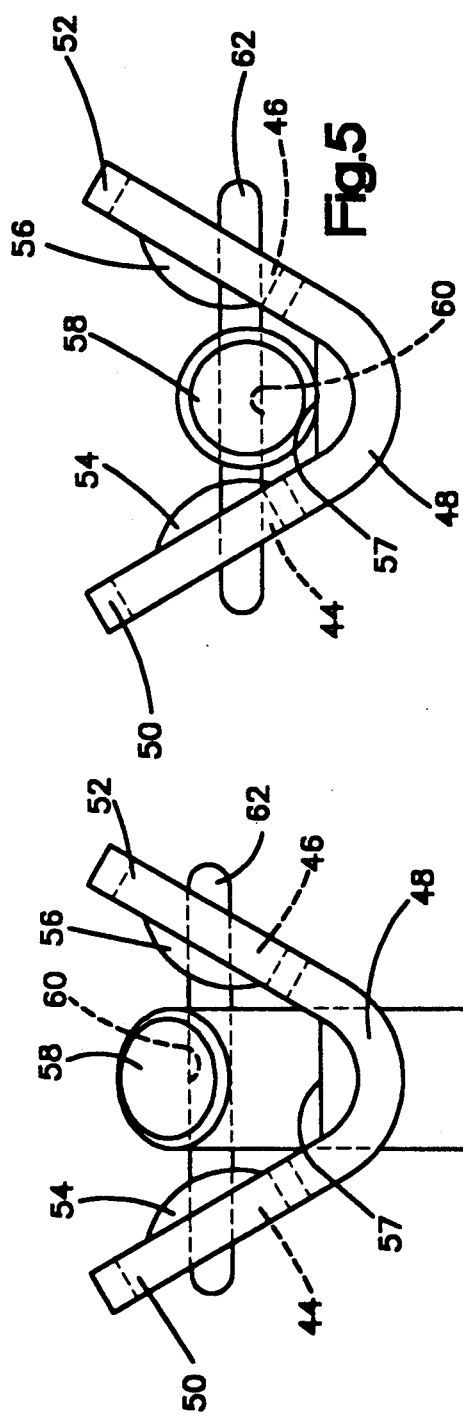
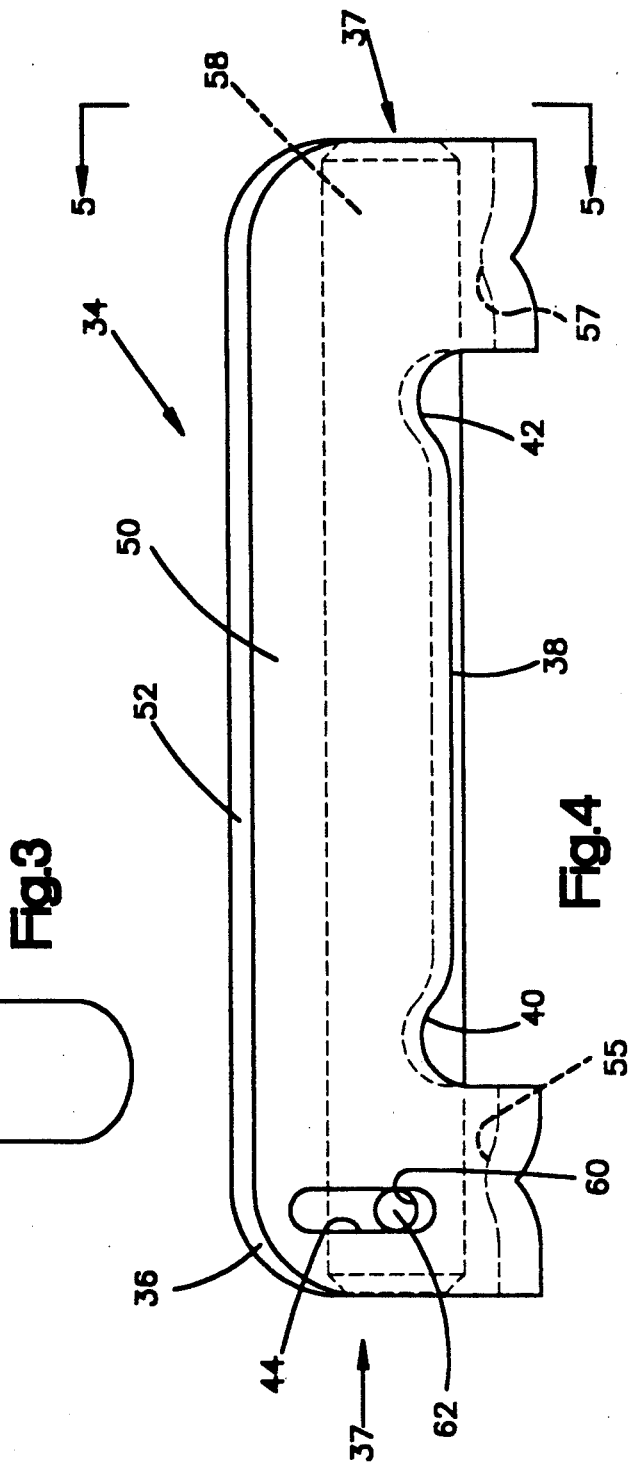

APPARATUS FOR RESTRICTING RELATIVE MOVEMENT OF BELT PORTIONS

TECHNICAL FIELD

The present invention relates to a three-point safety seat belt system for use in a vehicle, and is particularly directed to an apparatus usable with a three-point safety seat belt system for restricting relative movement of a lap belt portion and a shoulder belt portion of the belt webbing of the system.

BACKGROUND ART

A typical three-point safety seat belt system for use in a vehicle includes belt webbing having one end secured to the vehicle. The belt webbing is guided through a D-shaped ring secured to the vehicle, and the other end of the belt webbing is connected to a seat belt retractor secured to the vehicle. The seat belt retractor includes a spool on which the belt webbing is wound and from which the belt webbing is withdrawn. The belt webbing is slidable through the D-shaped ring as the belt webbing is wound onto the spool or withdrawn from the spool. A buckle tongue is carried by and slidable on the belt webbing. The tongue is latchable with a belt buckle fixed to the vehicle. When the tongue is latched with the belt buckle, the belt webbing is divided into a lap belt portion and a shoulder belt portion.

When it is desired to use a child's seat in the vehicle, the child's seat is first placed on a vehicle seat. The lap belt portion of the belt webbing is extended around the child's seat and the adjust tongue is latched with the belt buckle. The lap belt portion bears on the child's seat to secure the child's seat on the vehicle seat.

In a conventional three-point safety seat belt system, the belt webbing may be able to slide relative to the tongue even though the tongue is latched with the belt buckle. Sliding of the belt webbing relative to the adjust tongue may result in loosening of the lap belt portion about the child's seat. If the lap belt portion loosens about the child's seat, the child's seat may move relative to the vehicle seat.

There are known ways to restrict sliding of the belt webbing relative to the tongue when the lap belt portion of the belt webbing is used to secure the child's seat on a vehicle seat. One way is to use a second locking tongue in addition to the tongue which is latched with the belt buckle as disclosed in U.S. Pat. No. 4,685,740 to Fohl. The additional tongue permits tightening of the lap belt portion and resists loosening of the lap belt portion. The additional cost is a drawback in using an additional adjust tongue in a conventional three-point safety seat belt system.

Another known way to restrict sliding of the belt webbing relative to the tongue when a child's seat is secured on the vehicle seat is to use a known clip for securing the lap belt portion of the belt webbing to the shoulder belt portion of the belt webbing. The clip preferably is made from stamped metal and includes a pair of C-shaped end portions connected by a central bar. To use the clip, the lap and shoulder belt portions are overlapped and manipulated so that the belt portions are trained through the clip and around the bar. Tension on the belt causes the belt portions to be secured together and relative movement of the belt portions is restricted. Thus, the child's seat is secured on the vehicle seat.

SUMMARY OF THE INVENTION

The present invention is directed to an improved clip for use in a three-point safety seat belt system having a lap belt portion and a shoulder belt portion. A part of the lap belt portion and a part of the shoulder belt portion are overlapped and formed into a loop. The improved clip receives the loop and locks the lap and shoulder belt portions together when tension is applied to at least one of the belt portions.

The clip includes a first member having an opening for receiving the loop formed by the overlapped parts of the lap and shoulder belt portions. The apparatus further includes a second member movable relative to the first member and receivable in the loop. The second member engages a part of the loop and presses that part against the first member when tension is applied to either one of the belt portions. Relative sliding movement of the lap and shoulder belt portions is thereby restricted because the belt portions are clamped between the two members of the clip. Thus, when a child's seat is used with a three-point safety seat belt system and the clip is used, the child's seat will be restrained from sliding on the vehicle seat.

In a preferred embodiment of the present invention, the first member is a V-shaped member and has a pair of leg portions and a bight portion interconnecting the pair of leg portions. The V-shaped member has an opening at the bight portion through which the loop of overlapped first and second belt portions extends. The second member is a bar which is pivotally connected between the pair of leg portions of the V-shaped member. The bar is movable to a position between the pair of leg portions of the V-shaped member and into the loop formed by the first and second belt portions. The loop of overlapped belt portions extends around the bar and between the V-shaped member and the bar. The bar clamps a part of the loop against the leg portions of the V-shaped member when tension is applied to one of the belt portions. This restricts relative sliding movement of the first and second belt portions.

BRIEF DESCRIPTION OF THE DRAWINGS

Further features of the present invention will become apparent to those skilled in the art to which the present invention relates from reading the following specification with reference to the accompanying drawings, in which:

FIG. 1 is a schematic view of a three-point safety seat belt system using a clip assembly of the present invention to secure a child's seat on a vehicle seat;

FIG. 2 is a view of the clip assembly of FIG. 1 with parts thereof shown in one position;

FIG. 3 is a view of the clip assembly of FIG. 2 taken approximately along the line 3—3 of FIG. 2;

FIG. 4 is another view of the clip assembly of FIG. 2 showing the parts of the clip assembly in a different position;

FIG. 5 is a sectional view of the clip assembly of FIG. 4 taken approximately along the line 5—5 of FIG. 4;

DESCRIPTION OF A PREFERRED EMBODIMENT

Figure 6:
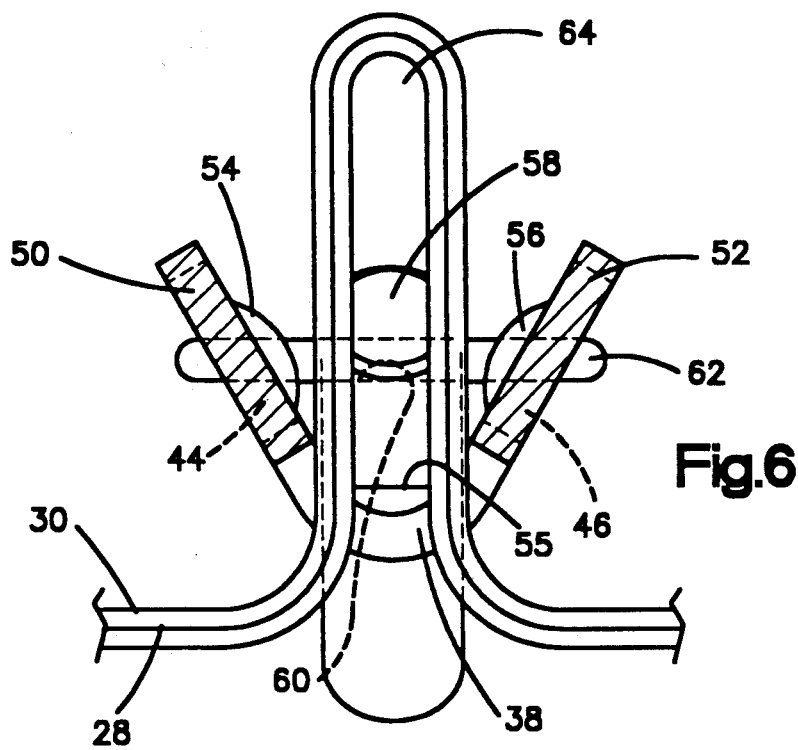
FIG. 6 is a sectional view of the clip assembly of FIG. 2 taken approximately along the line 6—6 of FIG. 2 showing a loop of overlapped belt portions inserted through the clip assembly.

The present invention is directed to an apparatus for restricting relative sliding movement of a first belt portion and a second belt portion arranged in an overlapping side-by-side relationship with the first belt portion. The specific construction and use of the apparatus may vary. As an example, the present invention is illustrated in FIG. 1 as embodied in a three-point safety seat belt system 10 for use in a vehicle.

The three-point safety seat belt system 10 includes belt webbing 12 for restraining an occupant of the vehicle against movement in the event of excessive vehicle deceleration, such as occurs in a crash or the like. One end 14 of the belt webbing 12 is secured by suitable fasteners to the vehicle. The belt webbing 12 is guided through the opening of a D-shaped ring 18 and the other end 16 of the belt webbing is secured to a seat belt retractor 20 secured by suitable fasteners to the vehicle. The retractor 20 includes a spool 21 on which the belt webbing 12 is wound. When tension is applied to the belt webbing 12 in a belt withdrawal direction, the webbing 12 is paid out from the spool 21. The belt webbing 12 slides through the opening of the D-shaped ring 18 as it is wound onto the spool 21 and withdrawn from the spool 21.

A slide tongue 22 is slidable on the belt webbing 12. The slide tongue 22 has a tongue plate 24 for latching to a belt buckle 26 secured by suitable fasteners to the vehicle. When the tongue plate 24 is latched with the belt buckle 26, the portion of the belt webbing 12 between the D-shaped ring 18 and the one end 14 of the belt webbing 12 is divided into a lap belt portion 28 and a shoulder belt portion 30. The lap belt portion 28 is that part of the belt webbing 12 between the one end 14 of the belt webbing and the tongue plate 24. The shoulder belt portion 30 is that portion of the belt webbing 12 between the tongue plate 24 and the D-shaped ring 18.

Referring to FIG. 1, the lap belt portion 28 of the belt webbing 12 is used to secure a child's seat 32 on a vehicle seat 11. The child's seat 32 is of the type which is secured on the vehicle seat 11 in what is known as the rear-facing position. In this position, a child seated in the child's seat faces the back of the vehicle seat 11. To secure the child's seat 32 on the vehicle seat 11, the lap belt portion 28 is extended around the child's seat 32 or through slots provided in the child's seat and the tongue plate 24 is latched with the belt buckle 26. For purposes of clarity, the back of the child's seat 32 is not shown in FIG. 1.

After the tongue plate 24 is latched with the buckle 26, a part of the shoulder belt portion 30 is overlapped with a part of the lap belt portion 28. The overlapped lap and shoulder belt portions 28, 30 are engaged by a clip 34. The clip 34 restricts relative sliding of the lap and shoulder belt portions 28, 30. Since relative sliding of the lap and shoulder belt portions 28, 30 is restricted, the seat 32 is secured in position on the vehicle seat 11.

Referring to FIGS. 2-5, the specific construction of the clip 34 is illustrated. As shown in FIGS. 2 and 3, the clip 34 includes a V-shaped member 36. The V-shaped member 36 has a bight portion 48 interconnecting a pair of leg portions 50, 52. The leg portions 50, 52 extend from the bight portion 48 in a manner to form a V-shaped profile as viewed from one end 37 of the V-shaped member 36, as shown in FIG. 3. An elongate slot 38 is formed in the bight portion and extends into the lower portion of the legs 50, 52. The elongate slot 38 has curved expanded opening portions 40, 42 at the opposite axial ends of the elongate slot 38. The expanded opening portions 40, 42 are curved and are provided to reduce stress concentration at the ends of the elongate slot 38 in the leg portions 50, 52 when tension is applied to the belt portions 28, 30.

The V-shaped member 36 has two elongate projections 54, 56 which extend parallel with the elongate slot 38. The elongate projections 54, 56 are located on opposite sides of the elongate slot 38 One elongate projection 54 is disposed on one leg portion 50 and the other elongate projection 56 is disposed on the other leg portion 52. Both elongate projections 54, 56 project toward the inside of the V-shaped member 36 as shown in FIG. 3. The two elongate projections 54, 56 provide the V-shaped member 36 with added rigidity and reinforcement.

The V-shaped member 36 also has a pair of projections 55, 57 which extend transverse to the slot 38. The projections 55, 57 are located at opposite axial ends of the slot 38. Both projections 55, 57 are located on the bight portion 48 of the V-shaped member 36 and project toward the inside of the V-shaped member 36. The two projections 55, 57 also provide the V-shaped member 36 with added rigidity and reinforcement.

As shown in FIG. 2, a major portion of the V-shaped member 36 is coated with a nylon material. The coated portion of the V-shaped member 36 is shown to the right of the line A—A. The coating is applied by dipping the V-shaped member 36 into a vat of the nylon material. The method of coating is conventional and will therefore not be described herein. This nylon coating protects the surface of the V-shaped member 36 and reduces the tendency of the V-shaped member 36 to slip relative to the belt webbing 12. The gripping ability of the nylon surface of the V-shaped member 36 is improved as compared to an uncoated surface.

The clip 34 further includes a webbing bar 58 pivotally connected at one end to one end 39 of the V-shaped member 36 and between the pair of leg portions 50, 52. A hinge pin 62 is inserted through a hole 60 in an end of the webbing bar 58 and is secured in the hole 60. The pin 62 is then inserted into elongate slots 44, 46 which are formed in the leg portions 50, 52 of the V-shaped member 36 and which extend transversely to the elongate slot 38. The webbing bar 58 is thereby connected for pivotal movement about the axis of the hinge pin 62 and for movement toward and away from the bight portion 48 due to movement of the hinge pin 62 in the elongate slots 44, 46. The elongate slots 44, 46 allow swinging movement of the webbing bar 58 between an open position such as shown in FIGS. 2 and 3 and a closed position as shown in FIGS. 4 and 5.

The area of the V-shaped member 36 adjacent the elongate slots 44, 46 is not coated with the nylon material. If that area of member 36 were coated, the movement of the hinge pin 62 may be restricted by the nylon material.

When the webbing bar 58 is in its closed position with no webbing extending between the webbing bar 58 and the V-shaped member 36, the webbing bar 58 lies transverse to the projections 55, 57 and parallel to the elongate slot 38 and the elongate projections 54, 56. The webbing bar 58 lies against the projections 55, 57 at the bight portion of the V-shaped member 36. The diameter of the webbing bar 58 is large enough to prevent the webbing bar 58 from falling through the elongate slot 38.

Figure 7:
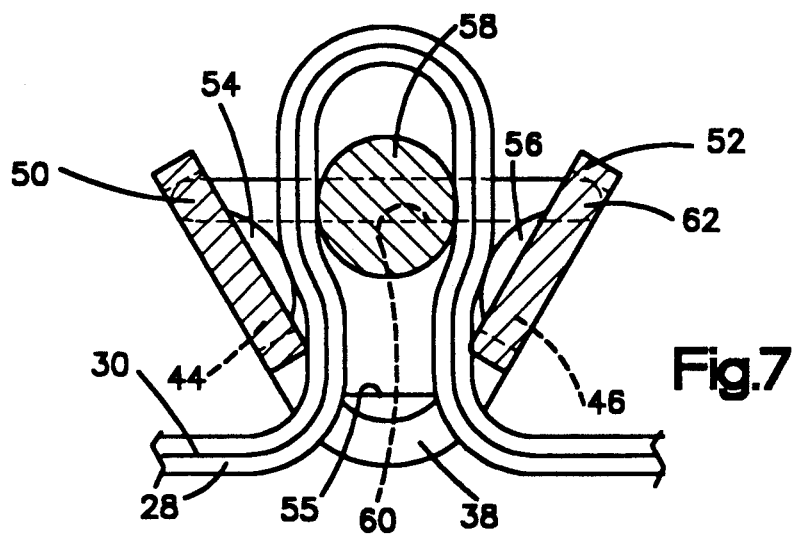
FIG. 7 is a view similar to FIG. 6 with parts in a different position.
Figure 8:
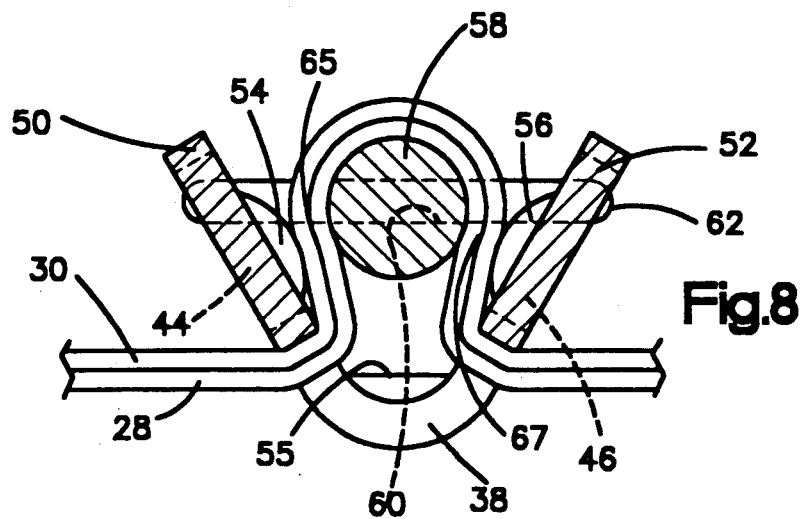
FIG. 8 is a view similar to FIG. 7 showing the parts in still another position.

The manner in which the clip 34 is used is illustrated in FIGS. 6–8. The webbing bar 58 is initially pivoted about the hinge pin 62 to an open position as shown in FIG. 2. A part of the lap belt portion 28 and a part of the shoulder belt portion 30 are arranged in an overlapping side-by-side relationship. The overlapped parts of the lap and shoulder belt portions 28, 30 are formed into a loop 64. The loop 64 of the overlapped lap and shoulder belt portions 28, 30 is inserted through the elongate slot 38 as shown in FIG. 6.

After the loop 64 is inserted through the elongate slot 38 of the V-shaped member 36, the webbing bar 58 is moved from its open position to its closed position shown in FIG. 7. In moving to its closed position, the webbing bar 58 is pivoted about the pin 62 until it lies roughly parallel to the V-shaped member 36 between the leg portions 55, 57 and in the loop 64. After the webbing bar 58 is moved to its closed position, the overlapped lap and shoulder belt portions 28, 30 are tensioned so that they lie against the webbing bar 58, as shown in FIG. 8. A first part 65 of the overlapped lap and shoulder belt portions 28, 30 of the loop 64 is clamped between the elongate projection 54 and the webbing bar 58. A second part 67 of the overlapped lap and shoulder belt portions 28, 30 of the loop 64 is clamped between the elongate projection 56 and the webbing bar 58.

As tension on at least one of the belt portions 28, 30 increases, a force acts on the webbing bar 58 in a direction which increases the clamping pressure on the first and second parts 65, 67 of the overlapped lap and shoulder belt portions 28, 30 of the loop 64. Thus, the magnitude of the clamping pressure on the first and second parts 65, 67 increases as the tension applied to one of the belt portions 28, 30 increases. The clamping of the first and second parts 65, 67 of the overlapped lap and shoulder belt portions 28, 30 of the loop 64 restricts relative sliding movement of the overlapped lap and shoulder belt portions 28, 30 of the loop 64. By restricting relative sliding movement of the overlapped lap and shoulder belt portions 28, 30 of the loop 64, loosening of the lap belt portion 28 around the child's seat 32 is prevented. Thus, when the lap belt portion 28 is used to secure the child seat 32 on the vehicle seat 11 and the clip 34 is connected with the lap and shoulder belt portions 28, 30 in the manner described hereinabove, loosening of the lap belt portion 28 about the child seat 32 is prevented.

To remove the clip 34 from the overlapped lap and shoulder belt portions 28, 30 of the loop 64, the loop 64 is moved from the position shown in FIG. 8 back to the position shown in FIG. 7. After the loop 64 is moved to the position as shown in FIG. 7, the webbing bar 58 is moved from its closed position to an open position. The overlapped lap and shoulder belt portions 28, 30 can then be pulled through the elongate slot 38. The clip 34 is thereby removed from the overlapped lap and shoulder belt portions 28, 30.

Although the clip of the present invention has been described with a child's seat of the type which faces the rearward direction when secured on a vehicle seat, the clip of the present invention may be used in the same manner with a child's seat of the type which faces the forward direction when secured on the vehicle seat The invention has been described above with reference to a preferred embodiment. Modifications of the present invention may become apparent to one skilled in the art upon reading and understanding the specification. It is intended to include all such modifications within the scope of the appended claims.

Having described a specific preferred embodiment of the invention, the following is claimed:

1. An apparatus for use with a first belt portion and a second belt portion arranged in a lengthwise overlapping side-by-side relationship with the first belt portion, said apparatus comprising:

a first member having a pair of leg portions and a bight portion interconnecting said leg portions, said first member having an opening in said bight portion for receiving a loop formed from the overlapping first and second belt portions;

each of said leg portions including a surface against which a part of one of the overlapping belt portions is engagable, the surfaces of said leg portions extending away from said bight portion and diverging relative to each other as they extend away from said bight portion; and a second member having a portion thereof pivotally connected to a portion of said first member and between said pair of leg portions of said first member, said second member being receivable in the loop for, when said second member is received in the loop and tension is applied to a belt portion, engaging the other one of the overlapping belt portions into engagement with respective diverging surfaces of said leg portions to clamp the overlapping belt portions between said second member and the diverging surfaces of said leg portions and thereby restrict relative sliding movement of the first and second belt portions, said first and second members clamping the overlapping belt portions along spaced apart parallel lines at locations of the overlapping belt portions spaced apart along the length of the overlapping belt portions.

2. The apparatus of claim 1 wherein a portion of said first member is coated with a nylon material.

3. The apparatus of claim 1 wherein the opening in said bight portion is an elongate slot having expanded opening portions at opposite axial ends of the elongate slot.

4. An apparatus for use in a three-point safety seat belt system having a lap belt portion and a shoulder belt portion, said apparatus comprising:

a first member having an opening for receiving a loop formed from a part of the lap belt portion and a part of the shoulder belt portion which are arranged in a side-by-side overlapping relationship, said first member being a V-shaped member having a bight portion interconnecting a pair of leg portions, the opening in said first member being an elongate slot located in the bight portion of said V-shaped member, the elongate slot having curved expanded opening portions at opposite axial ends of the elongate slot, the elongate slot being located in parts of said leg portions adjacent said bight portion; and a second member having a portion thereof pivotally connected to a portion of said first member and between said pair of leg portions of said first member, said second member being movable relative to said first member and being receivable in the loop formed by said parts of the lap and shoulder belt portions for clamping part of the loop against said first member when tension is applied to at least one of the belt portions to restrict relative sliding movement of said parts of the lap and shoulder belt portions.

5. The apparatus of claim 4 wherein said second member is a bar pivotally connected at one end to said leg portions of said V-shaped member, said bar being movable between an open position away from said opening and a closed position clamping said part of the loop against said leg portions of said V-shaped member.

6. An apparatus for use in a three-point safety seat belt system having a lap belt portion and a shoulder belt portion, said apparatus comprising:

a first member having an opening for receiving a loop formed from a part of the lap belt portion and a part of the shoulder belt portion which are arranged in a side-by-side overlapping relationship, said first member being a V-shaped member having a bight portion interconnecting a pair of leg portions;

a second member having a portion thereof pivotally connected to a portion of said first member and between said pair of leg portions of said first member, said second member being movable relative to said first member and being receivable in the loop formed by said parts of the lap and shoulder belt portions for clamping part of the loop against said first member when tension is applied to at least one of the belt portions to restrict relative sliding movement of said parts of the lap and shoulder belt portions;

the opening in said first member being an elongate slot located in the bight portion of said V-shaped member, the elongate slot having curved expanded opening portions at opposite axial ends of the elongate slot; and said V-shaped member including a first elongate projection projecting from one of said leg portions of said V-shaped member and a second elongate projection projecting from the other one of said leg portions of said V-shaped member, said first and second elongate projections extending parallel to the elongate slot and being located on opposite sides of the elongate slot.

7. The apparatus of claim 6 wherein said V-shaped member includes third and fourth projections projecting from parts of said bight portion and extending transversely to the slot and to said first and second projections, said third and fourth projections being located at opposite axial ends of the elongate slot for providing rigidity and reinforcement of said V-shaped member.

8. An apparatus for use with a first belt portion and a second belt portion arranged in an overlapping side-by-side relationship with the first belt portion, said apparatus comprising:

a first member having a pair of leg portions and a bight portion interconnecting said leg portions, said first member having an opening in said bight portion for receiving a loop formed from the overlapping first and second belt portions, the opening in said bight portion being an elongate slot having expanded opening portions at opposite axial ends of the elongate slot, the elongate slot being located in said bight portion of said first member and being located in parts of said leg portions adjacent said bight portion; and a second member having a portion thereof pivotally connected to a portion of said first member and between said pair of leg portions of said first member, said second member being receivable in the loop for clamping part of the loop against said first member when tension is applied to at least one of the belt portions to restrict relative sliding movement of the first and second belt portions.

9. The apparatus of claim 8 wherein said second member is a bar pivotally connected at one end of said leg portions, said bar being movable between an open position away from the elongate slot and a closed position in the loop clamping said part of the loop against said leg portions of said first member.

10. An apparatus for use with a first belt portion and a second belt portion arranged in an overlapping side-by-side relationship with the first belt portion, said apparatus comprising:

a first member having a pair of leg portions and a bight portion interconnecting said leg portions, said first member having an opening in said bight portion for receiving a loop formed from the overlapping first and second belt portions;

a second member having a portion thereof pivotally connected to a portion of said first member and between said pair of leg portions of said first member, said second member being receivable in the loop for clamping part of the loop against said first member when tension is applied to at least one of the belt portions to restrict relative sliding movement of the first and second belt portions;

the opening in said bight portion being an elongate slot having expanded opening portions at opposite axial ends of the elongate slot; and said first member including a first elongate projection projecting from one of said leg portions and a second elongate projection projecting from the other of said leg portions, said first and second elongate projections extending parallel with the elongate slot and being located on opposite sides of the elongate slot.

11. The apparatus of claim 10 wherein said first member includes third and fourth projections projecting from parts of said bight portion and extending transversely to the elongate slot and to said first and second elongate projections, said third and fourth projections being located at opposite axial ends of the elongate slot for providing rigidity and reinforcement of said first member.

* * * * *